(12) United States Patent
Aschauer et al.

(10) Patent No.: US 11,003,594 B2
(45) Date of Patent: May 11, 2021

(54) METHOD FOR PROTECTING SECURITY-RELEVANT DATA IN A CACHE MEMORY

(71) Applicant: Siemens Aktiengesellschaft, Munich (DE)

(72) Inventors: Hans Aschauer, Munich (DE); Markus Heintel, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/561,556

(22) PCT Filed: Mar. 22, 2016

(86) PCT No.: PCT/EP2016/056188
§ 371 (c)(1),
(2) Date: Sep. 26, 2017

(87) PCT Pub. No.: WO2016/156095
PCT Pub. Date: Oct. 6, 2016

(65) Prior Publication Data
US 2018/0081825 A1    Mar. 22, 2018

(30) Foreign Application Priority Data
Mar. 31, 2015   (DE) .......................... 102015205827.1

(51) Int. Cl.
*H04L 29/06* (2006.01)
*G06F 12/14* (2006.01)
(Continued)

(52) U.S. Cl.
CPC ........ *G06F 12/1408* (2013.01); *G06F 21/602* (2013.01); *G06F 21/755* (2017.08);
(Continued)

(58) Field of Classification Search
CPC ................. G06F 12/1408; G06F 21/78; G06F 2212/1052; G06F 2212/60; G06F 12/00;
(Continued)

(56) References Cited

U.S. PATENT DOCUMENTS 5,950,222 A * 9/1999 Yamada .............. G06F 12/0246
711/103
6,687,790 B2    2/2004 Zager et al.
(Continued)

FOREIGN PATENT DOCUMENTS

| CN | 103038830 A | 4/2013 |
| CN | 103049397 A | 4/2013 |

(Continued)

OTHER PUBLICATIONS

Jacob Nelson, "cse378 lecture 15", Feb. 9, 2009, https://courses.cs.washington.edu/courses/cse378/09wi/lectures/lec15.pdf,washington.edu. (Year: 2009).*

(Continued)

*Primary Examiner* — Taghi T Arani
*Assistant Examiner* — Lin Chang
(74) *Attorney, Agent, or Firm* — Schmeiser, Olsen & Watts LLP

(57) ABSTRACT

In a method for protecting security-relevant data in a cache memory, a copy of this security-relevant data from a general memory is stored in the cache memory, and the method includes stipulating obfuscation parameters, determining a first cache set address from a memory address of the general memory at which the security-relevant data are stored, generating a first modified cache set address for a first cache set with a generation function using the obfuscation parameters and the first cache set address, and storing the copy of the security-relevant data using the first modified cache set address in a first cache line of the first cache set.

13 Claims, 3 Drawing Sheets

(51) Int. Cl.
   *G06F 21/75* (2013.01)
   *G06F 21/60* (2013.01)
(52) U.S. Cl.
   CPC ............ *G06F 2212/1052* (2013.01); *G06F 2212/402* (2013.01); *H04L 2209/16* (2013.01)
(58) Field of Classification Search
   CPC ............ G06F 21/6254; G06F 21/79; G06F 2212/608; G06F 21/755; G06F 21/602; G06F 2212/405; G06F 2209/16; H04L 67/22
   See application file for complete search history.

(56) References Cited

U.S. PATENT DOCUMENTS

| | | | |
|---|---|---|---|
| 2001/0033444 | A1* | 10/2001 | Tomiyama ............ G11B 5/012 360/29 |
| 2004/0078544 | A1 | 4/2004 | Lee et al. |
| 2009/0327709 | A1 | 12/2009 | Garner et al. |
| 2010/0274973 | A1* | 10/2010 | Balakrishnan ...... G06F 12/0811 711/130 |
| 2010/0287382 | A1* | 11/2010 | Gyorffy ................. G06F 21/36 713/185 |
| 2011/0055592 | A1* | 3/2011 | Teuwen ............ G06F 12/1408 713/190 |
| 2011/0239088 | A1 | 9/2011 | Post |
| 2014/0019686 | A1* | 1/2014 | Dong ................. G06F 12/0864 711/128 |
| 2014/0047128 | A1 | 2/2014 | Correll |
| 2014/0082284 | A1 | 3/2014 | Abella Ferrer et al. |
| 2014/0095797 | A1* | 4/2014 | Lee ..................... G06F 12/0846 711/133 |
| 2014/0173193 | A1 | 6/2014 | Fahs et al. |
| 2014/0189366 | A1* | 7/2014 | Farrugia ................. G06F 21/60 713/189 |

FOREIGN PATENT DOCUMENTS

| | | |
|---|---|---|
| CN | 103116555 A | 5/2013 |
| CN | 103348662 A | 10/2013 |
| CN | 103810119 A | 5/2014 |
| CN | 103823763 A | 5/2014 |
| CN | 103885893 A | 6/2014 |

OTHER PUBLICATIONS

Neagu et al. "Protecting cache memories through data scrambling technique", Sep. 1, 2014, IEEE, Publishedin: 2014 IEEE 10th International Conference on Intelligent Computer Communication and Processing (ICCP) (Year: 2014).*
Liu et al. "Random Fill Cache Architecture", Jan. 15, 2015, IEEE, Published in: 2014 47th Annual IEEE/ACM International Symposium on Microarchitecture (Year: 2015).*
Eric Verner, "Random numbers in matlab—Part II", Jun. 9, 2014 https://matlabgeeks.com/tips-tutorials/random-numbers-in-matlab-part-2/,matlabgeeks.com. (Year: 2014).*
Zhenghong Wang; "Information leakage due to cache and processor architectures"; gefunden am 08022016 im Internet: URL:http://palms.princeton.edu/system/files/Dissertation_ZhenghonWang-sinlespaced.pdf; ISBN: 978-1-267-78457-5; XP055248492;; 2012.
Zhenghong Wang et al.: "New Cache Designs for Thwarting Software Cache-based Side Channel Attacks"; Proceedings of the 34th annual international symposium on Computer architecture, New York, USA, 2007; pp. 494-505 URL: http://www.cs.cmu.edu/afs/cs/Web/People/lba/LBA_reading_group/papers Sidechannel_isca07.pdf; 2007.
PCT International Search Report for PCT International Application No. PCT/EP2016/056188 dated Jun. 2, 2016.
Liu, Fangfei et al., "Random Fill Cahce Architecture," 2014 47th Annual IEEE/ACM International Symposium on Microarchitecture; pp. 203-215; IBAN: 1072-4451/14; DOI 10.1109/MICRO.2014.28; 2014.
Office Action in Chinese Application No. 201680019838.2 dated Oct. 9, 2019.
Office Action in corresponding Chinese Patent Application No. 201680019838.2 dated Sep. 27, 2020. 5 pages.

* cited by examiner

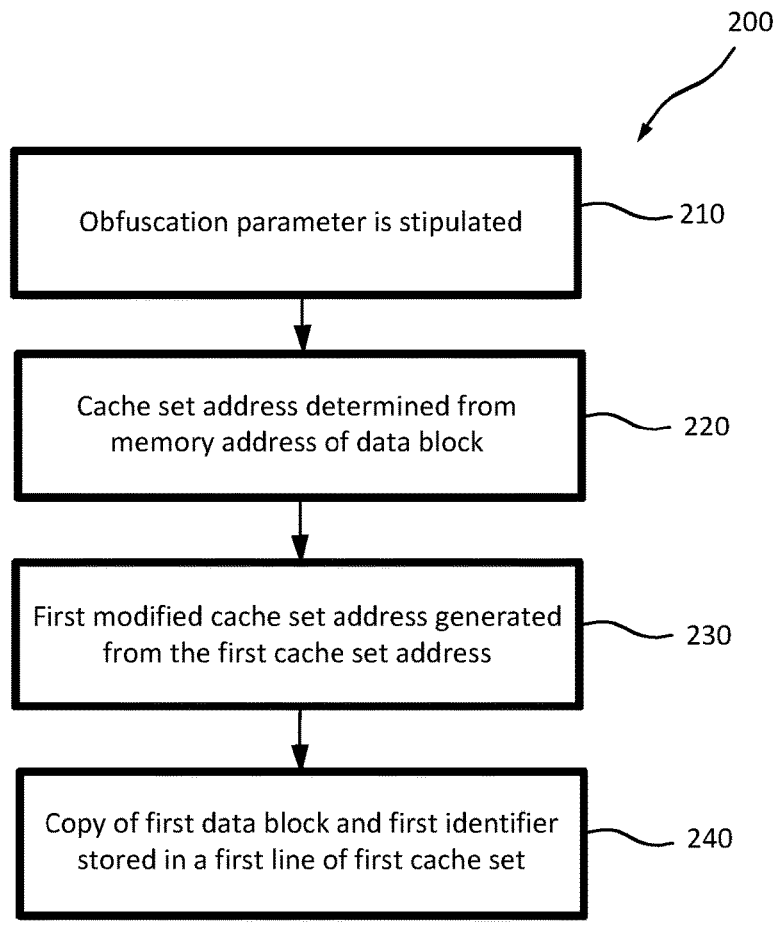
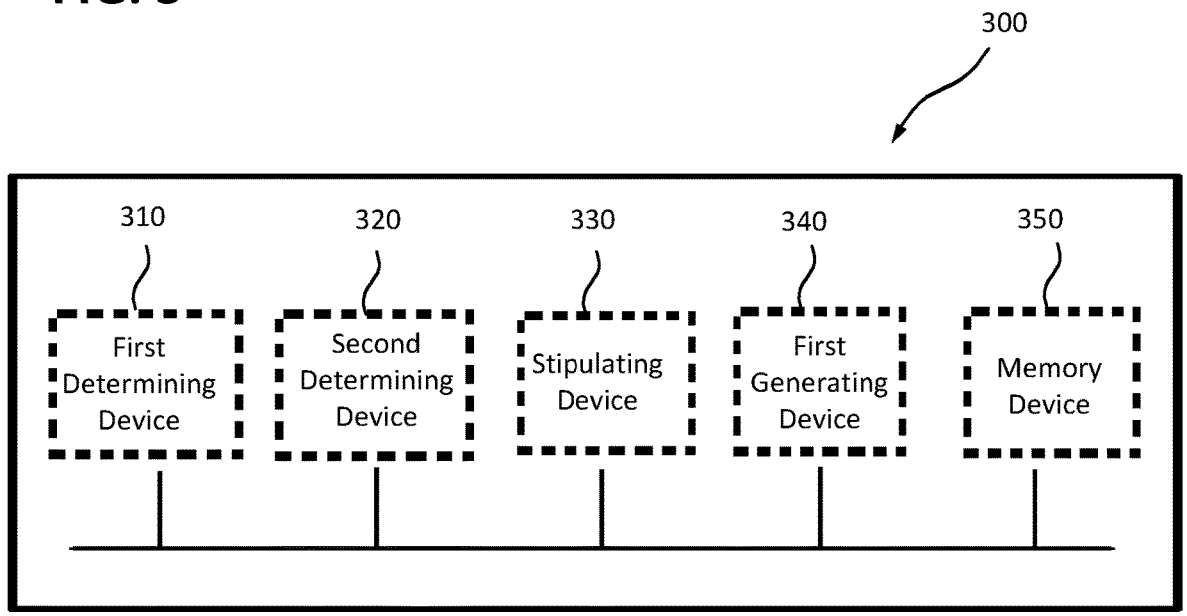

METHOD FOR PROTECTING SECURITY-RELEVANT DATA IN A CACHE MEMORY

CROSS-REFERENCE TO RELATED APPLICATIONS

This application claims priority to PCT Application No. PCT/EP2016/056188, having a filing date of Mar. 22, 2016, based off of German application No. DE 102015205827.1 having a filing date of Mar. 31, 2015, the entire contents of which are hereby incorporated by reference.

FIELD OF TECHNOLOGY

In modern microprocessors, which are used in computer systems, in order to speed up memory access, cache memories are used to buffer data from frequently used address regions of the working memory. This speeding up of memory access is achieved since the access time of the processor to the cache memory is significantly faster than the access time to data from the working memory. However, information about the process just executed can be obtained from the information as to which parts of the working memory are specifically loaded into the cache. These are, for example, frequently used entries of a table.

BACKGROUND

Particularly in cryptographic applications, this is a critical side channel, which can lead to the loss of secret keys to an attacker if a suitable evaluation is made for example. The attacks benefit from the fact that the assignment of addresses in the working memory to the position in the processor cache has only a low variability and thus can be evaluated statistically. Generally an attempt is made to obtain information about the variation of the cache content through the process to be analyzed, for example a cryptoalgorithm.

A common strategy is the evict-and-probe method. An analysis process initially fills the cache with its own data and then measures memory access times. In so doing, for example, cache hits or a cache miss can be measured. If this analysis is performed over a longer period of time, conclusions can be drawn regarding the security-relevant data of a cryptomethod, for example cryptographic keys for the AES method, and it is possible for an attacker for example to reconstruct this security-relevant data.

SUMMARY

An aspect relates to protecting security-relevant data in a cache memory.

According to a first aspect, embodiments of the invention relates to a method for protecting security-relevant data in a cache memory, wherein a copy of the security-relevant data from a general memory is stored in the cache memory. According to the method, obfuscation parameters are stipulated. A first cache set address is determined from a memory address of the general memory at which the security-relevant data are stored. A first modified cache set address for a first cache set is generated with a generating function using the obfuscation parameters and the first cache set address. The copy of the security-relevant data is stored using the first modified cache set address in a first cache line of the first cache set.

The use of the modified cache set address makes it difficult to analyze the cache data in order to obtain information about security-relevant data such as, for example, the cryptoalgorithm used and the cryptographic data of the cryptoalgorithm. By this means, the cryptographic data can be effectively protected from access by unauthorized persons. Through the method according to embodiments of the invention, the data in the cache memory are segmented and are scattered in the cache memory over a plurality of cache sets.

In a first embodiment of the method, a block address is determined from the memory address, wherein a first identifier is formed from the block address and wherein the generating function additionally uses the block address or the first identifier to generate the first modified cache set address.

The additional use of the first identifier or the block address when generating the first modified cache set address increases the security of the method still further.

In further embodiments of the method, the security-relevant data in the cache memory are accessed by means of the first identifier, the first cache set address and the generating function, wherein the generating function uses the obfuscation parameter, the first cache set address and the first identifier in order to generate the first modified cache set address.

In order to access the cache data, it is necessary, for example, that for example an assignment of the first modified cache set address to the first cache set address can be performed. This can be accomplished, for example, whereby, when storing the security-relevant data, a table is used which contains the necessary information for this assignment. If a modified cache set address, for example the first modified cache set address, is generated during storage of security-relevant data, the modified cache set address and the (unmodified) cache set address are stored in the table in the cache memory. Since this table on the one hand can entail security risks and additionally occupies memory space in the cache memory, the direct calculation of the modified cache set during access on the one hand increases the security and on the other hand the method is memory space-saving.

In further embodiments of the method, a modification of the obfuscation parameters is accomplished according to predefined rules, wherein a reorganization of the cache memory is carried out by the modification of the obfuscation parameters.

By the modification of the obfuscation parameters and the reorganization of the cache memory, it is even more difficult for attackers to analyze the cache memory and it therefore further increases the security of the method.

In further embodiments of the method, during the reorganization the data of the first cache line of the first cache set are mapped onto a second cache line of a second cache set, wherein further data of further cache lines of the first cache set are mapped completely or partially onto other cache lines of further cache sets.

Due to the mapping of one cache line of the first cache set onto the second cache set and the mapping of further cache lines of the first cache set completely or partially onto other cache lines of further cache sets, after a reorganization of the cache memory the analysis by attackers or unauthorized third parties is made even more difficult. Consequently, an additional protection of the security-relevant data is achieved thereby.

In further embodiments of the method, the generating function comprises a function which generates the first modified cache set address by a permutation of the first cache set address using the obfuscation parameters and the first identifier.

Access to data in the cache memory should ideally take place as rapidly as possible. Permutation operations such as, for example, an exclusive-or operation, which is accomplished bitwise on the first cache set address using the obfuscation parameters and the first identifier, can be calculated in a simple and highly efficient manner. This has the advantage that no complex or additional hardware need be integrated in the cache memory or a cache administration device.

In further embodiments of the method, the obfuscation parameters are modified after a predefined number of successful accesses to the cache memory.

The number of successful accesses to the cache memory can be calculated very easily, with the result that no complex or additional hardware need be integrated in the cache memory or a cache administration device.

In further embodiments of the method, the obfuscation parameters are modified by an interrupt request.

Operating systems which are used in high-security systems provide a large number of security functions in order to prevent access to security-relevant data by attackers. Upon identifying an attack, such an operating system can perform a large number of measures in order to bring the high-security system into a secure state. This also includes the fact that a reorganization or a modification of the obfuscation parameter can be actively brought about from the operating system by means of an interrupt request. The operating system in this case either stipulates the new obfuscation parameters itself or uses a generating device for obfuscation parameters in order to stipulate new obfuscation parameters.

In further embodiments of the method, the obfuscation parameter is modified within a predetermined time interval.

By modifying the obfuscation parameter within predetermined time intervals, it is ensured that an attacker only has a little time for the analysis of the cache memory. As a result, it is very difficult for the attacker to sufficiently obtain information during the analysis in order to obtain information about security-relevant data.

In further embodiments of the method, the obfuscation parameter contains a random number which is preferably re-formed in the event of a system re-start.

The use of a random number makes it difficult for attackers to guess the obfuscation parameter. As a result, an increased protection of the security-relevant data is achieved.

In further embodiments of the method, the obfuscation parameter comprises a unique hardware identifier.

The use of a hardware identifier with further data as obfuscation parameter allows an obfuscation parameter to be used which can be fixedly assigned to a device. This has the advantage that security systems identify when a device has been exchanged since a part of the obfuscation parameter does not correspond to the previous hardware identifier.

According to a further aspect, embodiments of the invention relate to a system for protecting security-relevant data in a cache memory, wherein a copy of the security-relevant data from a general memory is stored in the cache memory. The system comprises a first determining device, a stipulating device, a first generating device, and a memory device. The stipulating device is configured to stipulate obfuscation parameters. The first determining device is configured to determine a first cache set address from a memory address of the general memory at which the security-relevant data are stored. The first generating device is configured to generate a first modified cache set address for a first cache set with a generating device using the obfuscation parameters and the first cache set address. The memory device is configured to store the copy of the security-relevant data using the first modified cache set address in a first cache line of the first cache set.

The use of the modified cache set address makes it difficult to analyze the cache data in order to obtain information about security-relevant data such as, for example, the cryptoalgorithm used and the cryptographic data of the cryptoalgorithm. By this means, the cryptographic data can be effectively protected from access by unauthorized persons.

In a first embodiment, the system comprises a second determining device which is configured to determine a block address from the memory address, wherein a first identifier is formed from the block address and wherein the generating device additionally uses the block address or the first identifier to generate the first modified cache set address.

The additional use of the first identifier or the block address when generating the first modified cache set address increases the security of the method still further.

In further embodiments, the system has an access device which is configured to access the security-relevant data in the cache memory by means of the first identifier, the first cache set address and the generating device, wherein the generating device uses the obfuscation parameter, the first cache set address, and the first identifier in order to generate the first modified cache set address for accessing in the cache memory.

In order to access the cache data, it is necessary for example for the access device that, for example, an assignment of the first modified cache set address to the first cache set address can be performed. This can be accomplished, for example, whereby, when storing the data by the memory device, a table is used which contains the necessary information for this assignment. If a modified cache set address, for example the first cache set address, is generated during storage of data, the modified cache set address and the (unmodified) cache set address are stored in the table in the cache memory. Since this table on the one hand can entail security risks and additionally occupies memory space in the cache memory, the direct calculation of the modified cache set during access on the one hand increases the security and on the other hand the method is memory space-saving.

In further embodiments of the system, a modifying device is configured to modify the obfuscation parameters according to predefined rules and wherein a reorganization of the cache memory is performed by the modification of the obfuscation parameters.

By the modification of the obfuscation parameters by the modifying device and the reorganization of the cache memory, it is even more difficult for attackers to analyze the cache memory and this therefore further increases the security of the method.

In further embodiments of the system, the generating device comprises a permutation device which generates the first modified cache set address by a permutation of the first cache set address using the obfuscation parameters and the first identifier.

Access to data in the cache memory should ideally take place as rapidly as possible. Permutation operations such as are provided by the permutation device are, for example, an exclusive-or operation. This can be applied bitwise to the first cache set address using the obfuscation parameters and the first identifier, and can be calculated in a simple and highly efficient manner. This has the advantage that no complex or additional hardware need be integrated in the cache memory or a cache administration device.

In further embodiments of the system, the first determining device and the second determining device are configured as an integral determining device.

BRIEF DESCRIPTION

Some of the embodiments will be described in detail, with reference to the following figures, wherein like designations denote like members, wherein:

FIG. 2 shows a flow diagram of the method for protection of security-relevant data in a cache memory, in accordance with embodiments of the present invention;

FIG. 3 shows a schematic diagram of an obfuscation module, in accordance with embodiments of the present invention.

In the figures, elements having the same function are provided with the same reference numbers unless specified otherwise.

DETAILED DESCRIPTION

Figure 1:
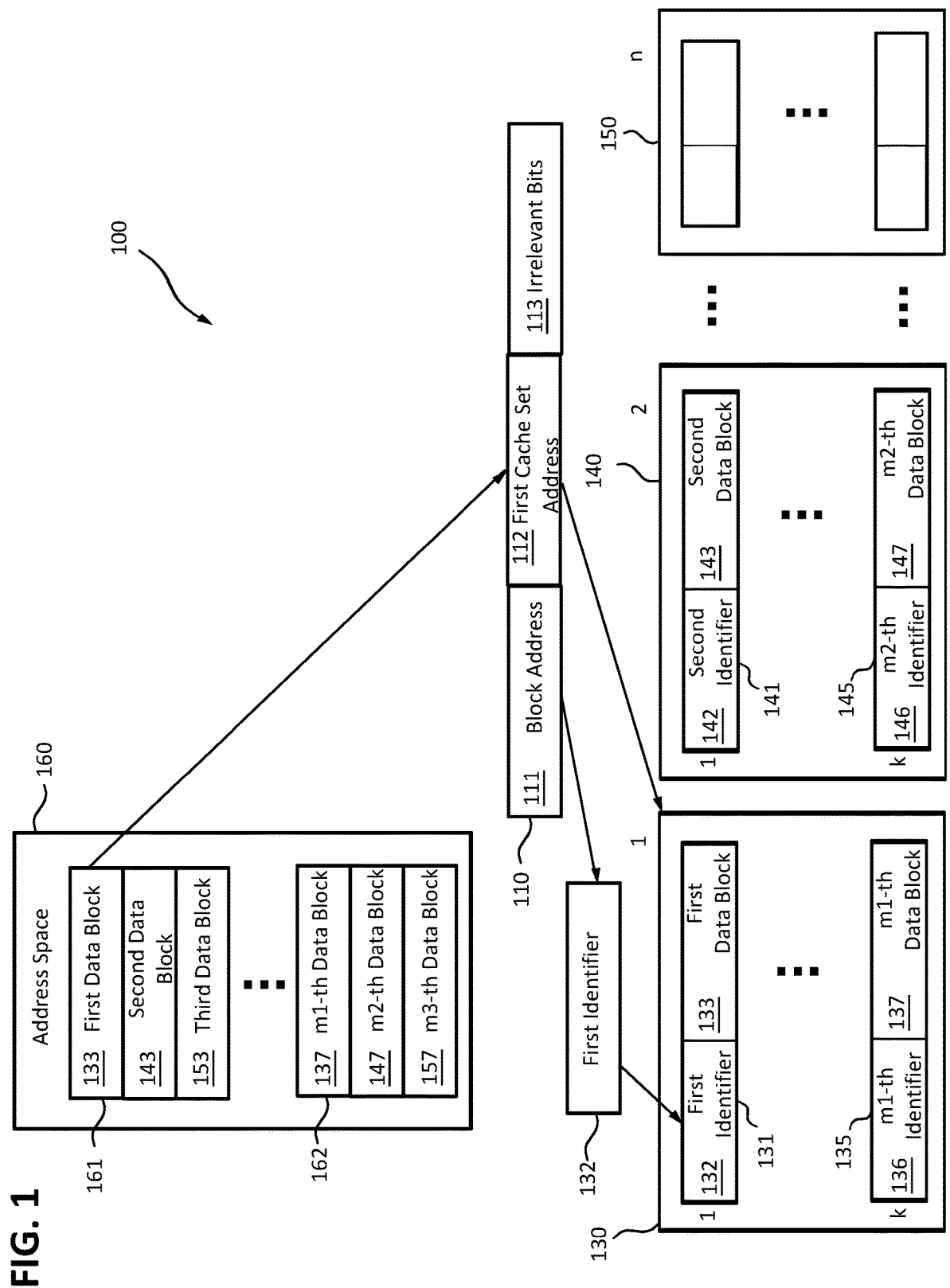
FIG. 1 shows a schematic diagram of a conventional system for storage of data in a cache memory.

FIG. 1 shows a simplified schematic diagram of a conventional system, which stores data in a cache memory. A cache or cache memory is a rapid buffer memory, which helps to avoid repeated accesses to a slow memory or a recalculation of data. To this end, data once loaded or generated are buffered in the cache memory so that it can be retrieved more rapidly during a subsequent access. In addition, it is possible to load in advance data, which are to be accessed soon with a high probability, into the cache memory.

FIG. 1 shows the typical organization of a cache memory for present-day systems, wherein k is the number of cache lines per cache set (k>=1). The number of cache sets n is obtained from n=cache size/(k*length of a cache line).

The fundamental sequence of how data is stored in the conventional manner in the cache memory will be explained in the following section. In addition, it is also discussed that this conventional method is problematical with regard to security-relevant data.

Firstly, the data of a computer system are mapped in the form of data blocks 133, 143, 153, 137, 147, 157 onto a memory, which is addressable via memory addresses 110 of an address space 160. In practice, there is a virtual and a physical address space, wherein this information is not required to illustrate the method and therefore is not considered in further detail either.

In this example, a byte is addressable in each case with a memory address. If a data block is stored, this occupies at least one byte and can be accessed via a memory address. Memory addresses can each be assigned to different address regions in order, for example, to address data blocks which occupy several bytes via an address region with a memory address, which is called initial address.

Consequently, the address space 160 is divided into a plurality of address regions, in which for example a first data block 133, a second data block 143, a third data block 153, an m1-th data block 137, an m2-th data block 147, and an m3-th data block 157 are stored. In FIG. 1 the first data block 133 is stored in a first address region 161 and the m1-th data block is stored in a second address region.

The cache memory usually comprises a plurality of cache sets 130, 140, 150 in order to receive a copy of a data block from the address space 160. FIG. 1 shows a first cache set 130, a second cache set 140, and an n-th cache set 150. In detail, a cache set comprises a large number of cache lines, cache line 1 to cache line k, in order to store one of the data blocks 133, 143, 153, 137, 147, 157 in one cache line.

The mapped first cache set 130 is stored at a first cache set address 112 in the cache memory, wherein the first cache set 130 comprises a plurality of cache lines, in which a copy of the data blocks 133 and 137 is to be stored. In detail, a first cache line 131 and a k-th cache line 135 are shown for the first cache set 130 in FIG. 1, wherein the k-th cache line 135 corresponds to the last cache line in the first cache set 130.

If a copy of the first data block 133 is loaded into the cache memory, a block address 111 and the first cache set address 112 are formed from a memory address 110 of the data block 133. For this purpose, for example, in a 64 bit system, bit 13 to bit 64 of the memory address 110 are selected for the block address 111 and bit 7 to 12 are selected for the first cache set address 112. Bits which were not used to form the block address 111 and the first cache set address 112 are irrelevant bits 113, which are not used for any further calculation.

The block address 111 is then used as a first identifier 132. If the data block 133 does not yet lie in the cache memory, a cache line 132, for example that used least frequently or that with the furthest-back last access, is selected and deleted in the cache set 130. This is replaced by the current data block 133. The first identifier 132 is also stored in order to subsequently enable an unambiguous assignment during the cache access. In FIG. 1 the first cache set address 112 of the first cache set 130 is initially determined and then the first data block 133 with the first identifier 132 is stored in the first cache line 131.

In the same way, the m1-th data block 137 of the second memory region 162 is stored by means of an m1-th memory address of the m1-th data block 137 in the k-th cache line 135 of the first cache set 130. To this end, a block address is again determined and from this an m1-th identifier 136 is formed. The first cache set address 112 is also determined by means of the m1-th memory address.

The assignment of which data block is stored in which cache set depends on the memory address of the data block. Address regions whose memory addresses differ by a multiple of the length of a data block are usually mapped onto a cache line in the same cache set. This means memory addresses which differ by a multiple of the number of bytes per cache line. This has the effect that the individual bits of the memory address 110, which determine the cache set address, are identical. With reference to the above-described example, this would relate to memory addresses whose bits 7-12 are identical. In FIG. 1 the first address region 161 and the second address region 162 therefore only differ by a multiple of their maximum data block size.

By means of the same method as was explained above, the second data block 143 is mapped by means of its second memory address onto the second cache set 140. Here a block address, a second identifier 142, and a second cache set address for the second cache set 140 are also determined from the second memory address.

Since the bits 7-12 of the m2-th memory address of the m2-th data block 147 and the second memory address are identical, the m2-th data block 147 is mapped onto a k-th cache line 146 of the second cache set 140 and stored with an m2-th identifier 146, which corresponds to a block address of the m2-th memory address of the m2-th data block 147, in the second cache set 140.

The third data block 153 and the m3-th data block 157 are mapped onto cache lines of the n-th cache set 150 by the same method.

However, this organization of the cache is susceptible to cache side channel attacks in the form of timing attacks and thus entails a security risk for security-relevant data. This problem has been explained in detail, for example, in the publication by Daniel J. Bernstein, "Cache-timing attacks on AES", 2005. Generally an attempt is made to obtain information about the variation of the cache content through the process to be analyzed, for example a cryptoalgorithm. A common strategy is the evict-and-probe method. An analysis process initially fills the cache with its own data and then measures cache access times. In so doing, for example, cache hits or a cache miss can be measured. If this analysis is performed over a longer period of time, conclusions can be drawn regarding the security-relevant data of a cryptomethod, for example cryptographic keys for the AES method, and in the most unfavorable case it is possible for an attacker to reconstruct this security-relevant data.

FIG. 2 shows a flow diagram of the method 200 according to embodiments of the invention for protection of security-relevant data in a cache memory.

The method 200 is capable of no longer mapping address regions whose memory addresses only differ by a multiple of the maximum data block length onto a cache line in the same cache set after a reorganization of the cache memory.

In order to protect a copy of a data block containing security-relevant data from side channel attacks, during storage of the data in the cache memory, if this has not yet been done already, an obfuscation parameter is stipulated in a process step 210. In this exemplary embodiment, the obfuscation parameter is a set of random numbers.

If the data block, which for example contains the security-relevant data in the form of key information for a cryptographic method, is to be buffered in the cache memory or a copy of the data is to be stored, in a process step 220 a cache set address is initially determined from the memory address of the data block.

In order to store a copy of the data block in the cache memory, another block address is determined from the memory address and a first identifier is formed from the block address. By means of the first cache set address, it should be possible for the computer system to store the copy of the data block in the cache memory and access the copy of the data block.

In a process step 230, a first modified cache set address is generated from the first cache set address by means of a generating function, the obfuscation parameter, and the first identifier. In this exemplary embodiment, the generating function is an exclusive-or function which is applied bitwise with the obfuscation parameter and the first identifier to the first cache set address.

For example, for a first identifier with a length of 52 bits, this is extended with two leading 0 bits to 54 bits. These 54 bits are then divided into nine 6-bit words w1 to w9. In addition, a 6-bit obfuscation parameter o and the unmodified 6-bit cache set address s consisting of the bits 7-12 of the memory address is determined. The modified cache set address is then generated by means of the calculation $$A = w1 \oplus w2 \oplus \ldots \oplus w9 \oplus s \oplus o \quad \text{Formula 1}$$

wherein "$\oplus$" stands for XOR or the exclusive-or function and A is the modified cache set address. Here the individual 6-bit words, the 6-bit obfuscation parameter, and the unmodified 6-bit cache set address s are each applied bitwise to one another by means of the exclusive-or function.

By means of the first modified cache set address, it is stipulated where a first cache set lies in the cache memory. The copy of the first data block and the first identifier are then stored in a process step 240 in a first cache line of the first cache set.

The assignment of the first modified cache set address to the first cache set address can be made via a table. The first modified cache set address is entered in this table, after it has been generated by the generating function. Alternatively, the table can also be calculated completely beforehand.

If the first data block in the cache memory is now to be accessed, the first cache set address is used to determine the first modified cache set address via the table. By means of the first modified cache set address and the first identifier, the data block in the cache memory is then accessed if this data block has already been stored in the cache memory.

In order to protect the data from side channel attacks, the obfuscation parameter is modified after, for example, a fixed or randomly selected number of 500 cache hits and replaced by new random numbers. As a result of this modification, the cache memory must initially be reorganized since an assignment of modified cache set addresses, for example the first modified cache set address, and relevant cache set addresses, for example the first cache set address, is no longer correct.

The modification of the obfuscation parameter has the result that, during a reorganization of the cache memory, the data which had previously been buffered as copies in the first cache line of the first cache set are mapped onto a second cache line of a second cache set during a renewed storage of a copy. In addition, copies of further data which were buffered in further cache lines of the first cache set are in this case now mapped as new copies completely or partially onto other cache lines of further cache sets.

In other words, for example after 500 cache hits, the reorganization of the cache memory is forced. After this reorganization of the cache memory, the copies of the data or data sets are no longer accessible in the cache memory and this results in a cache miss. Now, using the method according to embodiments of the invention, copies of the data, which lie in address regions of the address space, are again written into the cache memory and consequently the cache memory is rebuilt.

The advantage is that the address regions, whose memory addresses only differ by a multiple of the length of a cache line, are no longer mapped onto a cache line in the same cache set.

Since the cache memory is reorganized again and again, by monitoring the cache memory it is no longer possible to draw conclusions regarding the security-relevant data, which are used in a process.

FIG. 3 is a schematic diagram of an obfuscation module 300 according to embodiments of the invention. The obfuscation module 300 is a possible embodiment of the patent claims, which are directed to a system.

The obfuscation module 300 comprises a first determining device 310, a second determining device 320, a stipulating device 330, a first generating device 340, and a memory device 350, which are connected to one another via a data bus.

If a copy of a data block is to be stored in the cache memory, the first determining device 330 initially determines a first cache set address from a memory address of the data block. The data block can contain most diverse data in this case. This can, for example, be data, which are publicly accessible. It can however also be, for example, personal data, for example client data, and security-relevant data, for example cryptographic data, which may only be used by access-authorized persons.

The second determining device 320 is used to determine a block address from the memory address and form a first identifier from the block address. However, it is possible that the block address is used directly as first identifier.

If no obfuscation parameters have been stipulated so far, obfuscation parameters are stipulated by means of the stipulating device 330. The generating device 340 then generates a first modified cache set address for a first cache set with a generating device using the obfuscation parameters, the first cache set address, and the first identifier. The memory device 350 then stores the security-relevant data together with the first identifier using the first modified cache set address in a first cache line of the first cache set.

Figure 4:
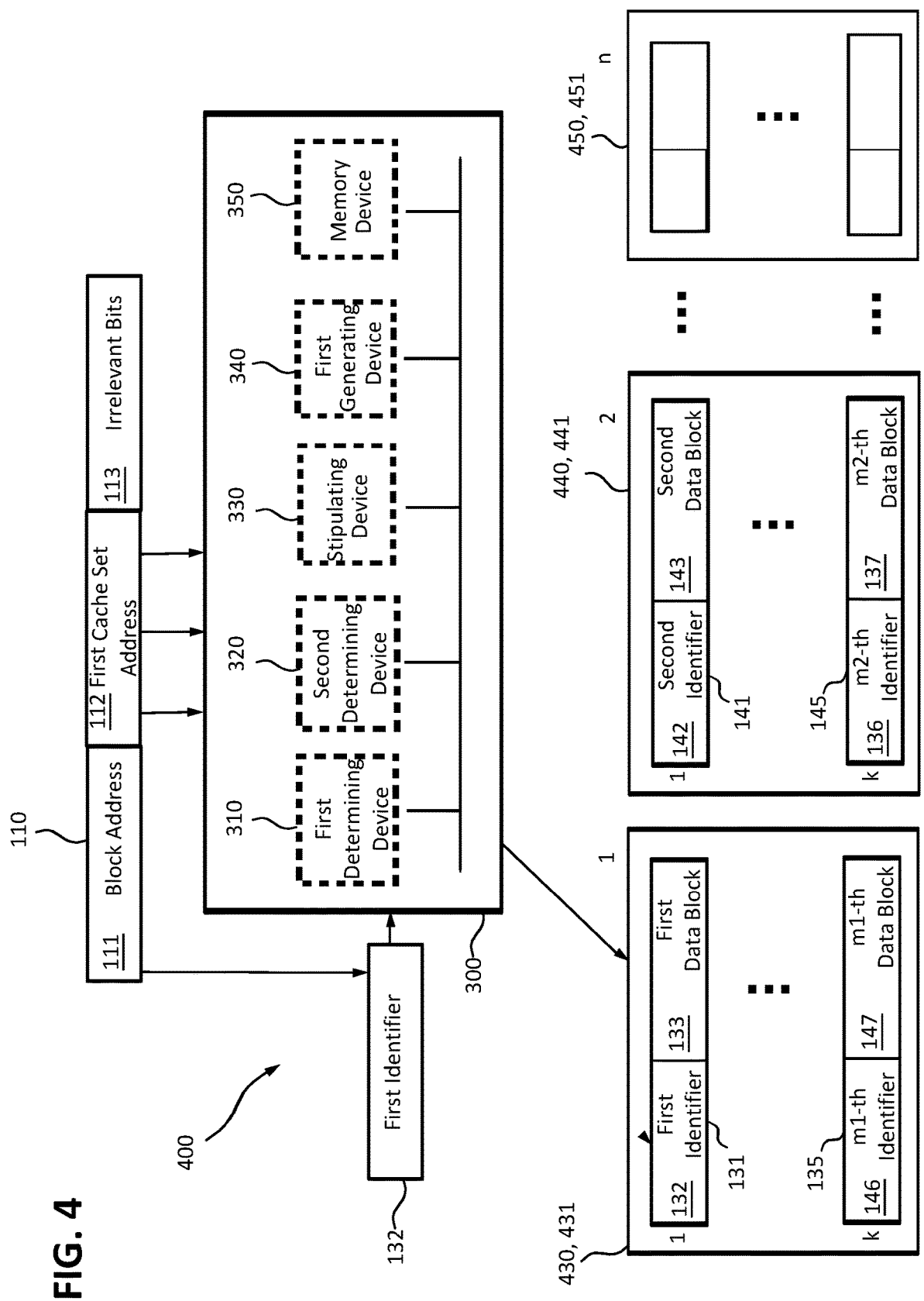
FIG. 4 shows a schematic diagram of a system for storage of data in a cache memory, in accordance with embodiments of the present invention.

FIG. 4 shows a schematic diagram of a system 400 according to embodiments of the invention for storage of data in a cache memory. The system 400 according to embodiments of the invention uses an obfuscation module 300 according to the invention as has been described in FIG. 3.

The exemplary embodiment shows the organization of a cache memory, wherein k is the number of cache lines per cache set (k>=1). The number of cache sets n is obtained from n=cache size/(k*length of a cache line).

The data of a computer system are initially mapped in the form of data blocks onto a memory, which is addressable via memory addresses 110.

In this exemplary embodiment, one byte in each case is addressable with a memory address. If a data block is stored, this occupies at least one byte and is accessible via a memory address. Memory addresses can be assigned to different address regions in each case, in order, for example, to address data blocks which occupy several bytes via an address region with a memory address, which is also called initial address.

Consequently, the address space is divided into a plurality of address regions, in which for example a first data block 133, a second data block 143, a third data block 153, an m1-th data block 137, an m2-th data block 147, and an m3-th data block 157 are stored.

The cache memory usually comprises a plurality of cache sets, which can receive a copy of a data block from the address space. FIG. 4 shows a first cache set 430 with a first modified cache set address 431, a second cache set 440 with a second modified cache set address 441, and an n-th cache set 450 with an n-th modified cache set address 451. In detail, a cache set comprises a plurality of cache lines, cache line 1 to cache line k, in order to store one of the data blocks 133, 143, 153, 137, 147, 157 in a cache line.

The mapped first cache set 430 is stored at the first modified cache set address 431 in the cache memory, wherein the first cache set 430 comprises a plurality of cache lines, in which a copy of the data blocks 133 and 147 are to be stored. In detail, FIG. 4 shows a first cache line 131 and a k-th cache line 135 for the first cache set 430, wherein the k-th cache line 135 corresponds to the last cache line in the first cache set 430.

If a copy of the first data block 133, see FIG. 1, is loaded into the cache memory, a block address 111 and the first cache set address 112 are formed from a memory address 110 of the data block 133. To this end, for example, in a 64 bit system, bit 13 to bit 64 of the memory address 110 are selected for the block address 111 and bit 7 to 12 are selected for the first cache set address 112. Bits which were not used to form the block address 111 and the first cache set address 112 are irrelevant bits 113, which are not used for any further calculation.

The block address 111 is then used as a first identifier 132. The first modified cache set address 431, which is used to address the first cache set 430 in the cache memory and store a copy of the data block 133, is determined as follows:

Firstly, an obfuscation parameter is stipulated by a stipulating device 330 of the obfuscation module 300 if this has not yet been stipulated. By means of a first generating device 340 of the obfuscation module 300, the first modified cache set address 431 is then generated from the first cache set address 112 using a generating function, the obfuscation parameter, and the first identifier 132.

If a copy of the data block 133 does not yet lie in the cache memory, a cache line 131, for example that used least frequently or that with the furthest-back last access, is selected and deleted in the cache set 430. This is replaced by the current data block 133. The first identifier 132 is also stored in order to subsequently enable an unambiguous assignment during the cache access.

In the same way, the m2-th data block 147 is stored by means of an m2-th memory address of the m2-th data block 147 in the k-th cache line 135 of the first cache set 130. To this end, a block address is again determined and an m2-th identifier 146 is formed from this.

By means of the same method as has been explained above, the second data block 143 is mapped by means of its second memory address onto the second cache set 440. Here a block address, a second identifier 142, and a second modified cache set address for the second cache set 440 are likewise determined from the second memory address.

Using the same method, the third data block 153 and the m3-th data block 157 are mapped onto cache lines of the n-th cache set 150.

By means of the first modified cache set address 431, it is therefore stipulated where the first cache set 430 lies in the cache memory. The assignment of the first modified cache set address 431 to the first cache set address 112 can be made via a table. The first modified cache set address 431 is entered in this table after it has been generated by the generating function.

If the first data block 133 in the cache memory is now to be accessed, the first cache set address 112 is used to determine the first modified cache set address 431 via the table. By means of the first modified cache set address 431 and the first identifier 132, the data block 133 in the cache memory is then accessed if this data block 133 has already been stored in the cache memory.

In order to protect the data from side channel attacks, the obfuscation parameter is modified after, for example, 500 cache hits and replaced by new random numbers. As a result of this modification, the cache memory must firstly be reorganized since an assignment of modified cache set addresses, for example the first modified cache set address, and relevant cache set addresses, for example the first cache set address, is no longer correct.

The modification of the obfuscation parameter has the result that, during a reorganization of the cache memory, the data which had previously been buffered as copies in the first cache line of the first cache set are mapped onto a second cache line of a second cache set during a renewed storage of a copy. In addition, copies of further data which were buffered in further cache lines of the first cache set are in this case now mapped as new copies completely or partially onto other cache lines of further cache sets.

In other words, for example after 500 cache hits, the reorganization of the cache memory is forced. After this reorganization of the cache memory, the copies of the data or data sets are no longer accessible in the cache memory and this results in a cache miss. Now, using the method according to embodiments of the invention, copies of the data are again written into the cache memory and consequently the cache memory is rebuilt.

The advantage is that the address regions, whose memory addresses only differ by a multiple of the length of a cache line, are no longer mapped onto a cache line in the same cache set.

Since the cache memory is reorganized again and again, by monitoring the cache memory it is no longer possible to draw conclusions regarding the security-relevant data, which are used in a process.

In said exemplary embodiments, for the data which are buffered in the cache memory, no distinction is made as to whether this comprises security-relevant data or noncritical data. It is assumed that fundamentally all the data comprises security-relevant data.

In one variant of said exemplary embodiments, for access to a data block in the cache memory the first modified cache address for an access can also be formed directly from the first cache set address by means of the generating function, the first identifier, and the obfuscation parameter. Here the table is dispensed with in order, for example, to save memory space on a processor.

In another variant of said exemplary embodiments, the obfuscation parameters are modified after a predefined number of successful accesses to the cache memory. This can be accomplished by means of a simple counter, which can be configured via a system interface by an administrator, in order to take account of different security requirements. Such a configuration could however also be executed for example via a program update, for example as firmware update.

In another variant of said exemplary embodiments, the obfuscation parameters are modified by an interrupt request. When identifying an attack, an operating system can perform a plurality of measures to bring itself into a secure state. This also includes the fact that a reorganization or a modification of the obfuscation parameter can be brought about actively by the operating system by means of an interrupt request.

In another variant of said exemplary embodiments, the obfuscation parameters are modified within a predetermined time interval. This can be accomplished, for example, by means of a simple internal clock. In another variant, the clock can be configured via a system interface by an administrator in order to take account of different security requirements. Such a configuration could however also be executed for example via a program update, for example as firmware update.

Although the invention has been illustrated and described in detail by the exemplary embodiments, the invention is not restricted by the disclosed examples and other variations can be deduced from this by the person skilled in the art without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for protecting security-relevant data in a cache memory, wherein a copy of the security-relevant data from a general memory is stored in the cache memory, the method comprising:
   stipulating obfuscation parameters;
   determining a first cache set address from a memory address of the general memory at which the security-relevant data are stored;
   generating a first modified cache set address for a first cache set with a generating function using the obfuscation parameters and the first cache set address;
   storing a copy of the security-relevant data using the first modified cache set address in a first cache line of the first cache set; and
   modifying the obfuscation parameters by an interrupt request such that a reorganization of the cache memory is carried out,
   wherein during the reorganization the data of the first cache line of the first cache set are mapped onto a second cache line of a second cache set and wherein further data of further cache lines of the first cache set are mapped completely or partially onto other cache lines of further cache sets.

2. The method as claimed in claim 1, wherein a block address is determined from the memory address, a first identifier is formed from the block address, the generating function additionally uses the block address or the first identifier to generate the first modified cache set address.

3. The method as claimed in claim 2, wherein an access to the security-relevant data in the cache memory is made by means of the first identifier, the first cache set address and the generating function, wherein the generating function uses an obfuscation parameter, the first cache set address and the first identifier in order to generate the first modified cache set address.

4. The method as claimed in claim 1, wherein the generating function comprises a function which generates the first modified cache set address by a permutation of the first cache set address using the obfuscation parameters and/or the first identifier.

5. The method as claimed in claim 1, wherein the obfuscation parameters are modified after a predefined number of successful accesses to the cache memory.

6. The method as claimed in claim 1, wherein the obfuscation parameters are modified within a predetermined time interval.

7. The method as claimed in claim 1, wherein the obfuscation parameter contains a random number which is preferably re-formed in the event of a system re-start.

8. The method as claimed in claim 1, wherein the obfuscation parameters comprise a unique hardware identifier.

9. A system for protecting security-relevant data in a cache memory, wherein a copy of the security-relevant data from a general memory is stored in the cache memory, comprising:
   a microprocessor including the cache memory,
   wherein the microprocessor is configured to:
   stipulate obfuscation parameters;
   determine a first cache set address from a memory address of the general memory at which the security-relevant data are stored;
   generate a first modified cache set address for a first cache set with a generating function using the obfuscation parameters and the first cache set address; and
   store the copy of the security-relevant data in the cache memory using the first modified cache set address in a first cache line of the first cache set, wherein the microprocessor is configured to modify the obfuscation parameters by an interrupt request such that a reorganization of the cache memory is performed, and such that during the reorganization the data of the first cache line of the first cache set are mapped onto a second cache line of a second cache set and wherein further data of further cache lines of the first cache set are mapped completely or partially onto other cache lines of further cache sets.

10. The system as claimed in claim 9, wherein the microprocessor is further configured to determine a block address from the memory address, wherein a first identifier is formed from the block address and wherein the microprocessor additionally uses the block address or the first identifier to generate the first modified cache set address.

11. The system as claimed in claim 10, wherein the system is part of a computer system including the microprocessor, wherein the computer system is configured to access the security-relevant data in the cache memory by means of the first identifier and the first cache set address, wherein the microprocessor is configured to use the obfuscation parameter, the first cache set address, and the first identifier in order to generate the first modified cache set address for accessing in the cache memory.

12. The system as claimed in claim 9, wherein the microprocessor is configured to generates the first modified cache set address by a permutation of the first cache set address using the obfuscation parameters and the first identifier.

13. The system as claimed in claim 10, wherein the microprocessor is further configured to determine a block address from the memory address, wherein the first identifier is formed from the block address and wherein the microprocessor uses the block address or the first identifier to generate the first modified cache set address.

* * * * *